(12) United States Patent
Thomson

(10) Patent No.: US 9,869,466 B2
(45) Date of Patent: Jan. 16, 2018

(54) HEAT RECOVERY

(71) Applicant: Waste Heat Recovery Ltd., Ayrshire (GB)

(72) Inventor: Colin Thomas Thomson, Stephenville, TX (US)

(73) Assignee: Waste Heat Recovery Ltd., Ayrshire (GB)

( * ) Notice: Subject to any disclaimer, the term of this patent is extended or adjusted under 35 U.S.C. 154(b) by 133 days.

(21) Appl. No.: 14/380,439

(22) PCT Filed: Feb. 28, 2013

(86) PCT No.: PCT/GB2013/050506
§ 371 (c)(1),
(2) Date: Aug. 22, 2014

(87) PCT Pub. No.: WO2013/128200
PCT Pub. Date: Sep. 6, 2013

(65) Prior Publication Data
US 2015/0047579 A1    Feb. 19, 2015

(30) Foreign Application Priority Data
Mar. 1, 2012 (GB) .................................. 1203642.2

(51) Int. Cl.
*F25B 27/02* (2006.01)
*F22B 1/16* (2006.01)
(Continued)

(52) U.S. Cl.
CPC ................. *F22B 1/16* (2013.01); *A01J 7/022* (2013.01); *F22B 1/18* (2013.01); *F24D 17/001* (2013.01);
(Continued)

(58) Field of Classification Search
CPC .. F24D 17/001; F24D 17/02; F24D 2200/123; F24D 2200/16; F24D 2200/24;
(Continued)

(56) References Cited

U.S. PATENT DOCUMENTS 4,316,367 A * 2/1982 Yaeger .................... F24D 17/02
62/238.6
4,321,797 A * 3/1982 Yaeger .................... F24D 17/02
62/238.6
(Continued)

FOREIGN PATENT DOCUMENTS

AU      2009 201076     11/2009
EP         1884648       6/2008
(Continued)

*Primary Examiner* — Gregory Huson
*Assistant Examiner* — Daniel E Namay
(74) *Attorney, Agent, or Firm* — Stephen T. Scherrer; Monique A. Morneault; Scherrer Patent & Trademark Law, P.C.

(57) ABSTRACT

A heat recovery system arranged to heat water includes at least one heat exchanger (9) arranged to heat water by heat exchange with waste heat. A storage reservoir (11) is arranged to store water heated by the heat exchanger (9). The heat exchanger (9) is switchable between a first mode of operation in which water is circulated by a pump (12) in a circuit that includes the storage reservoir (11) and the heat exchanger (9), and a second mode of operation in which water is circulated by the pump (12) in a circuit that by-passes the heat exchanger (9). Heated water of at least a desired minimum temperature can be supplied to at least one outlet during both the first and second modes of operation.

16 Claims, 8 Drawing Sheets

(51) Int. Cl.
*A01J 7/02* (2006.01)
*F24D 17/02* (2006.01)
*F24D 17/00* (2006.01)
*F24D 19/00* (2006.01)
*F22B 1/18* (2006.01)
*F25B 40/04* (2006.01)
*F24H 4/02* (2006.01)
*F24D 3/18* (2006.01)

(52) U.S. Cl.
CPC ......... *F24D 17/02* (2013.01); *F24D 19/0092* (2013.01); *F24D 2200/12* (2013.01); *F24D 2200/123* (2013.01); *F24D 2200/16* (2013.01); *F24D 2200/24* (2013.01); *F24D 2200/31* (2013.01); *F24D 2220/0235* (2013.01); *F24D 2220/048* (2013.01); *F24D 2220/10* (2013.01); *F25B 40/04* (2013.01); *F25B 2400/0405* (2013.01); *F25B 2400/06* (2013.01); *F25B 2600/2501* (2013.01); *Y02B 10/70* (2013.01); *Y02B 30/52* (2013.01); *Y02P 60/891* (2015.11)

(58) Field of Classification Search
CPC .. F24D 2200/31; F24D 3/18; F24D 2220/048; F24D 2220/10; F22D 1/16; F22D 1/18; A01J 7/022; A01J 7/02; Y02P 60/891; Y02B 30/52; F24H 4/02; F25B 27/02; F25B 40/04; F25B 2400/0405; F25B 2400/06; F25B 2600/2501
USPC ......... 237/8 C, 8 A, 8 D, 2 B, 12.1; 122/7 R
IPC ......... F22B 1/16,1/18; A01J 7/02; F24D 17/02, 3/18; F25B 40/04, 27/02; F24H 4/02
See application file for complete search history.

(56) References Cited

U.S. PATENT DOCUMENTS

| | | | |
|---|---|---|---|
| 8,245,948 B2 * | 8/2012 | Cho | F25B 27/02 122/1 R |
| 9,003,818 B2 * | 4/2015 | Choi | F24D 3/18 62/173 |
| 2006/0283967 A1 * | 12/2006 | Cho | F24F 3/1423 237/12.1 |
| 2007/0012058 A1 * | 1/2007 | Cho | F25B 13/00 62/238.7 |
| 2007/0079769 A1 * | 4/2007 | Ryoo | F24D 3/08 122/4 R |
| 2007/0246555 A1 * | 10/2007 | Nishimura | F24D 3/08 237/2 B |
| 2008/0023961 A1 * | 1/2008 | Cho | F25B 27/02 290/2 |
| 2009/0020281 A1 * | 1/2009 | Ueda | F24D 11/005 165/287 |
| 2010/0031953 A1 * | 2/2010 | Penev | F24D 17/0021 126/615 |
| 2010/0050675 A1 * | 3/2010 | Kameyama | F24D 17/001 62/238.7 |
| 2010/0163016 A1 * | 7/2010 | Pan | F24D 11/0221 126/613 |
| 2010/0257882 A1 * | 10/2010 | Penev | F24D 17/0021 62/235.1 |
| 2011/0259025 A1 * | 10/2011 | Noh | F24D 3/08 62/160 |
| 2011/0259027 A1 * | 10/2011 | Choi | F24D 3/18 62/196.1 |
| 2011/0283726 A1 * | 11/2011 | Sim | F24D 3/18 62/160 |
| 2011/0314848 A1 * | 12/2011 | Tanaka | F25B 13/00 62/126 |
| 2011/0315093 A1 * | 12/2011 | Minamisako | F24D 11/0214 122/1 R |
| 2012/0073782 A1 * | 3/2012 | Moon | F28D 7/16 165/11.1 |
| 2012/0159980 A1 * | 6/2012 | Moure | F24D 11/025 62/238.6 |
| 2013/0098096 A1 * | 4/2013 | Nakayama | F24D 11/0214 62/324.6 |

FOREIGN PATENT DOCUMENTS

| | | | |
|---|---|---|---|
| GB | 2 459 955 | 11/2009 | |
| JP | 57192735 A | * 11/1982 | ......... F24D 11/0214 |
| JP | 07174414 A | * 7/1995 | |
| JP | 2000297700 A | * 10/2000 | ............... F02G 5/00 |
| WO | WO 2011/045767 | 4/2011 | |

* cited by examiner

Test 1: Flow Diagram Performance Test Circulating @ 10 US GPM (37.8 litres/min) Using Maneurop MT100 Compressor

HEAT RECOVERY

The present invention relates to heat recovery and in particular, but not exclusively, to the recovery of waste heat to heat water. The waste heat can also be transferred to heat transfer fluids other than water with such heat transfer fluids subsequently transferring their heat to a receiving fluid. Alternatively, the waste heat can be transferred directly to a receiving fluid such as water, oil, milk or other liquids which are frequently consumable liquids. By way of example, the waste heat can be used to pasteurise consumable liquids or defrost transported food and drink which have been frozen for transportation.

The rising cost of energy has drawn attention to the value of recovering heat from waste heat streams. This is of particular interest to those food processors running refrigeration equipment and requiring large quantities of hot water for washing, sterilising, and rinsing food processing plant.

Air conditioning equipment should be considered to lie within the definition of refrigeration equipment for the purposes of this application. Residential and commercial air conditioning units generate large amounts of waste heat energy, and this can be captured from the discharge gas from a compressor and delivered cost effectively to a receiving fluid, for example, to cold water.

Such food processing plants may either be industrial units located, for example, on industrial estates, or located at the source of food production, for example, on farms. Such plants will include dairies, breweries, wineries, cheese plants, and meat processing plants, although this list is by no means limiting. In the example of dairy farmers, a second driving force, in addition to the rising cost of energy, is to become more efficient, leading to pressure to seek economies of scale, by for example, larger and larger numbers of milking cows in each production unit. As the number of dairy cows increases, the need for industrialisation and automation of dairy equipment becomes paramount.

In a first aspect, the present invention provides a heat recovery system as set out in claim 1. Preferred features of the system are the subject of claims 2 to 13.

In this aspect, the waste heat recovery system is arranged to heat water wherein the system includes one or more heat exchangers arranged to heat water by heat exchange with waste heat, a storage reservoir arranged to store water so heated by the heat exchanger(s) and a pump, wherein the heat exchangers are switchable between a first mode of operation in which water is circulated by the pump in a circuit that includes the storage reservoir and the heat exchanger(s), and a second mode of operation in which water is circulated by the pump in a circuit that by-passes the heat exchanger(s), wherein heated water of at least a desired minimum temperature can be supplied to at least one outlet during both the first and second modes of operation.

The one or more heat exchangers may be switched between the first and second modes of operation according to the water level in the storage reservoir. Thus, the one or more heat exchangers may be switched to the first mode of operation when the water level in the storage reservoir reaches an upper limit and circulation of water through the heat exchanger(s) may then be employed to maintain the desired minimum temperature. The one or more heat exchangers may be switched to the second mode of operation when the water level in the storage reservoir reaches a lower limit and circulation of heated water may be diverted to bypass the one or more heat exchangers while the one or more heat exchangers heat an incoming supply of water until the level of heated water in the storage reservoir reaches an upper limit without the temperature of the heated water in the storage reservoir falling below the desired minimum temperature.

In applications where larger volumes of hot water and/or higher water temperatures are required, an in-line heat pump or secondary compressor can be installed in the discharge pipe of the primary compressor. The heat pump or secondary compressor increases the discharge gas temperature and pressure, and therefore generates additional heat which can subsequently be transferred to a receiving fluid.

It may be that one or more heat storage unit(s) can be incorporated within the waste heat recovery system. This aspect of the invention can be of particular use for storing waste heat during times when waste heat is available but when there is little requirement for use of recovered heat, for example, once the water tank is full and the temperature set point has been satisfied. Such a heat storage unit can also be installed in applications where storage space is an issue. The heat storage units are designed and built specifically to take account of the physical properties of the refrigerant being used.

The heat storage units can be installed in a cascade arrangement in which the design temperature of each bank of heat storage units is lower than the previous one, thus forming a series of what are effectively pre-condensers, wherein a bank of heat storage units at the higher temperature end of the cascade de-superheats the refrigerant, and at the lower end, a bank of heat storage units capture the sensible heat from the refrigerant until a temperature is reached at which the condensing cycle is started, thereby capturing maximum waste heat energy. This condensing cycle is preferably created by installing a cascade of heat storage units starting with the highest design temperature heat storage unit, and thereafter gradually descending heat storage unit design temperatures until the condensing temperature of the refrigerant is reached. A preferred type of heat storage unit for this aspect of the invention are those containing phase change materials in order to access the latent heat associated with phase change. It will be apparent that heat storage units of differing design temperatures will contain a different phase change material.

For example, with an R22 refrigerant, the cascade would start with a 200° F. (93° C.) heat storage unit and reduce for example by 20° F. (11° C.) per heat storage unit in the case where 5 heat storage units are installed in cascade, until 120° F. (49° C.) is reached, as this is the temperature at which condensing will begin at a refrigerant pressure of around 220 psig. Once the phase change material attains a selected particular temperature above that at which it becomes liquid, a three way valve at entry to each bank of heat storage units will close allowing the refrigerant to by-pass that bank of heat storage units and allow refrigerant of higher temperature to arrive at the following bank of heat storage units in the cascade. The heat storage units are connected in series, making the refrigerant travel through heat storage units of descending design temperature, heating the phase change material in each heat storage unit until its design temperature is reached, at which temperature the phase change material will become liquid. To return the phase change material to its original state, a colder fluid, air or gas must pass through the secondary circuit of the heat storage unit. The heat storage unit is then able to release the heat back into the receiving fluid, as the phase change material reverts to its solid state. Any heat storage unit in such a system may have multiple heat exchangers from separate compressors incorporated within its system, so that the heat storage unit can be charged with heat from multiple cooling circuits. In order to increase the rate of heat transfer within a heat storage unit or a plurality of heat storage units of similar design temperature, once its design temperature has been exceeded and the phase change material has become liquid, it can be beneficial to include an in-line pump to circulate the phase change material within the one or more heat storage units of similar design temperature and thereby increase the rate of heat transfer.

Any suitable source of waste heat may be employed. In preferred embodiments, waste heat from a refrigeration, chilling or air conditioning system is employed. The waste heat may be recovered from a refrigeration cycle in which one or more compressors are driven by an electric motor or other means.

By means of the present invention, water can be heated using waste heat from a refrigeration cycle to temperatures in excess of 150° F. (65° C.) without the assistance of supplementary gas or electric water heating, in sufficient quantities to run wash, sterilising and rinse cycles at a temperature required to sterilise the equipment in accordance with local regulations. It may be that a ready supply of hot water can be produced at temperatures up to 180° F. (82° C.) in sufficient quantity as is required for the effective washing and sterilising of food processing equipment, particularly, but not exclusively, in those plants where liquids are being processed.

Refrigerants currently in use in refrigeration systems include R-22 but, due to its ozone depletion potential, R-22 is increasingly being replaced by other refrigerants such as R404A, R407C, R134a and R507A, all of which have no ozone depletion potential and are therefore becoming more widely used as ozone-depleting refrigerants such as R-22 are phased out. However, R404A and R410A are thought to have a high global warming potential (1725 times the effect of carbon dioxide), similar to that of R-22. For most effective use of the present invention, it may be desirable to use a refrigerant which produces an exit gas temperature of at least 200° F. (93° C.). Ammonia, which has a higher gas discharge temperature than most refrigerants, even R22, may be especially suitable for use in the present invention.

An example of waste heat recovery from a refrigeration system as described in this invention is that used on dairy farms to cool milk after harvesting. All dairy farms are required to rinse, sterilise, and rinse again, their milk storage tanks and pipe work at the end of each milking session. This is typically done using a first cold water rinse to remove the bulk of any residual milk, followed by a hot water wash in which a detergent is included, followed by another cold water rinse and finished by a sterile cold water rinse. The wash and rinse process may typically take thirty minutes. By using the waste heat recovery system described herein, it may be that the hot water requirements of dairies ranging in size from small family run dairies milking 100 cows to large commercial dairy herds milking many thousands of cows, can be met without the need for supplementary water heating.

A small dairy farm of 100 cows for example will typically use a 100,000 BTU (29.3 kW) compressor to drive its refrigeration cycle. A typical refrigeration compressor of such a size which may be used in association with this invention is a Maneurop MT100HS®. A milking session for this size of dairy may take 2 hours, after which it is necessary to wash the pipelines and tanks. For such a size of dairy, 80-100 US gallons (302-378 liters) of hot water at 150° F. (65° C.) would be required. With the waste heat recovery system of the present invention, 1 US gallon per minute of hot water at 150° F. (65° C.) may be produced using the waste heat from a Maneurop MT 100® compressor producing up to 120 US gallons of hot water at 150° F. (65° C.) in 2 hours, sufficient to meet requirements and providing a surplus of hot water by the end of each milking session.

Similarly, a dairy farm of 300 milking cows will typically have three 100,000 BTU (29.3 kW) compressors driving its refrigeration cycle and the same pro rata surplus of hot water at 150° F. (65° C.) may be produced by the end of each milking session. Such a dairy farm of 300 milking cows will typically require 150 to 200 US gallons (570 to 760 liters) of hot water to wash and sanitise milk pipelines and milk receivers, and 80 to 100 US gallons (300 to 380 liters) to wash and sanitise milk storage tanks.

A system comprising a single compressor is illustrated in FIG. 1 and a system comprising more than one compressor is illustrated in FIG. 2. It has been found preferable that, at least in the case of compressors of up to and including 100,000 BTU (29.3 kW), each compressor has its own refrigerant circuit and therefore, in the case of the present invention, its own heat exchanger. However, in the case of larger installations comprising more than one compressor, it may be possible to incorporate a fully manifolded system where a single refrigerant circuit is shared by all compressors.

It may be that the storage reservoir comprises a well insulated tank built with, for example, a food grade material such as isophthalic resin, filament wound e-glass, a foam insulation core, an exterior skin of, for example, fibreglass, and optionally finished with white gel coat. Such a tank design can result in a tank having a very high insulation factor.

It may be that the storage reservoir is two to three times the volume of a typical tank installed as current practice on dairy farms of a similar size. By means of such a large reservoir, enough hot water may be provided for any 24 hour period of use.

By means of the present invention, the efficiency of waste heat recovery may be raised to a level where adequate hot water is provided without supplementary electrical or gas water heating, whether purchased or in the case of supplementary electrical heating, generated by solar panels or wind turbines.

A further optional feature of the present invention is that the incoming water supply may be pre-heated, for example, by means of a further heat exchanger. This may be especially beneficial in countries where water supply temperatures can fall below 46° F. (8° C.) and so become a limiting factor in the volume of hot water achievable.

In a preferred aspect of the invention, brazed plate heat exchangers are employed. Brazed plates within the heat exchanger may allow higher pressure and temperature operation due to the absence of rubber or other non-metallic parts including, for example, the seals between the plates of the heat exchanger. Having multiple high friction passes, brazed plate heat exchangers may recover a greater part than hitherto possible of the waste energy from the compression cycle often currently rejected to atmosphere by means of condenser fans.

Brazed plate heat exchangers suitable for the efficient operation of the present invention include those offered by Southwest Thermal Technology Inc. Brazed plate heat exchangers offer compact size and high efficiency operation. They are composed of a number of plate elements, each of which comprises two thin nested plates, these elements defining flow spaces between them, with adjacent elements being joined around their periphery by brazing bent edge portions.

Brazed plate units are up to six times smaller than alternative heat exchange equipment of the same capacity. The explanation lies in the construction of stainless steel plates brazed together with every plate turned 180° in opposition to each other. This design creates two highly turbulent fluid channels that flow in opposite directions over a larger surface area per unit volume allowing significantly higher heat transfer performance.

In food processing industry applications, double walled, true counter flow, mechanically cleanable, heat exchangers are preferred in order to enhance quality assurance although any type of double walled heat exchangers can be used in heat recovery systems described in this invention. Double walled tubular heat exchangers suitable for inclusion within the system of the present invention include those offered by Doucette Industries Inc.

Waste heat recovering hot water tanks frequently used in current practice systems are inefficient at recovering waste heat as only one wall is provided for heat exchange with hot refrigerant gas. Measurement in trials conducted in the development of this invention has shown that the temperature at which the hot refrigerant gas leaves the current practice hot water tank is higher than the water temperature within the tank, thereby demonstrating that all of the waste heat is not being recovered, whereas in this invention, we can recover a very much higher percentage of useable waste heat by means of brazed plate heat exchangers combined with advanced control systems providing the highest known efficiency of waste heat recovery.

A further feature of this invention is that the high velocity of the water passing through the heat exchangers, when circulating water between the storage reservoir and the heat exchanger, may be employed to reduce deposition of scale which may be especially beneficial in hard water areas, thereby eliminating the need for down time to wash out and purge the system of built up scale.

The pressure required to circulate hot water at a typical rate of 10 US gallons (38 liters) per minute through the restricted passages of the brazed plate heat exchangers may be enhanced by means of an orifice, for example one of 5/16" (8 mm) diameter, placed at entry to the brazed plate heat exchangers. This creates a back pressure which is sufficient to supply all the equipment requiring hot water during the wash cycle such as tank washers and parlour wash systems, thereby avoiding the use of an additional pump and creating further energy saving.

Each brazed plate heat exchanger may be fully temperature controlled by means of 3 way bypass valves so that when the temperature of the water in the hot water storage tank reaches a set point, for example 150° F. (65° C.), the hot refrigerant gas is automatically diverted to the condenser as in a conventional system.

Preferred features of the invention include one or more or all of the following:
1. The use of high efficiency brazed plate heat exchangers or double-walled tubular heat exchangers as opposed to heat recovery tanks.

Whilst high efficiency brazed plate heat exchangers are preferred to operate the invention, the present invention does not rely on the use of such heat exchangers. Other currently available types of heat exchanger such as double walled tubular heat exchangers will perform satisfactorily, albeit perhaps less efficiently but more easily cleanable, and it is to be anticipated that new types of heat exchanger could be developed in the future which perform even better than the high efficiency heat exchangers described herein.

2. Pressurizing the hot water system using the back pressure resulting from the use of brazed plate heat exchangers and restriction orifices.
3. The use of waste heat during a filling mode of operation so that the storage reservoir receives hot water at or just below the set temperature as top up and as a result, hot water at the required temperature is continuously available for washing and sanitising pipelines or equipment.
4. The use of waste heat during a circulation mode of operation to maintain a set water temperature whilst also flushing the heat exchangers with high flow rates of hot water, thereby significantly reducing downtime for cleaning the heat exchangers, either manually or by chemical flushing and purging.

The units of refrigeration are always a unit of power. Domestic and commercial refrigerators may be rated in kilojoules per second (kJ/s) or British thermal units per hour (Btu/hour) of cooling. For commercial and industrial refrigeration systems, most of the world uses the kilowatt (kW) as the basic unit of refrigeration. Typically, commercial and industrial refrigeration systems in North America are rated in tons of refrigeration (TR). Historically, one TR was defined as the energy removal rate that will freeze one short ton of water at 0° C. (32° F.) in one day. This was important because many early refrigeration systems were in ice houses. This simple TR unit provided a simple way to measure a day's output of ice against energy consumption. While ice houses make up a much smaller part of the refrigeration industry than they once did, the unit TR has nevertheless remained in use in North America. The unit's value as historically defined is approximately 11,958 Btu/hr (3.505 kW) but has been redefined to be exactly 12,000 Btu/hr (3.517 kW).

While not a recognised parameter, a refrigeration system's coefficient of performance (CoP) is very important in determining a system's overall efficiency. It is defined as refrigeration capacity in kW divided by the energy input in kW. While CoP is a very simple measure of performance, it is typically not used for industrial refrigeration in North America. Owners and manufacturers of these systems typically use performance factor (PF). A system's PF is defined as a system's energy input in horsepower divided by its refrigeration capacity in TR. Both CoP and PF can be applied to either the entire system or to system components. For example, an individual compressor can be rated by comparing the energy needed to run the compressor versus the expected refrigeration capacity based on inlet volume flow rate. It is important to note that both CoP and PF for a refrigeration system are defined at specific operating conditions. Moving away from the defined operating conditions can dramatically change a refrigeration system's performance as illustrated in the example of a Maneurop MT100HS compressor in FIG. 7.

In a second aspect, the present invention provides a method of recovering waste heat to heat a receiving fluid such as water by providing a system according to the first aspect of the invention.

The method may include providing one or more heat exchangers for heating water by heat exchange with waste heat, a storage reservoir for water so heated and a pump for circulating water, the method including the steps of switching the heat exchanger between a first mode of operation in which water circulated by the pump passes through the one or more heat exchangers and a second mode of operation in which water circulated by the pump by-passes the one or more heat exchangers and the one or more heat exchangers are connectable to an incoming supply of water.

In a third aspect, the present invention provides a method of recovering waste heat to heat any suitable heat transfer fluid by providing a system according to the first aspect of the invention These and other features, benefits and advantages of the invention will be more fully understood from the following description of exemplary embodiments with reference to the accompanying drawings in which.

Figure 7:
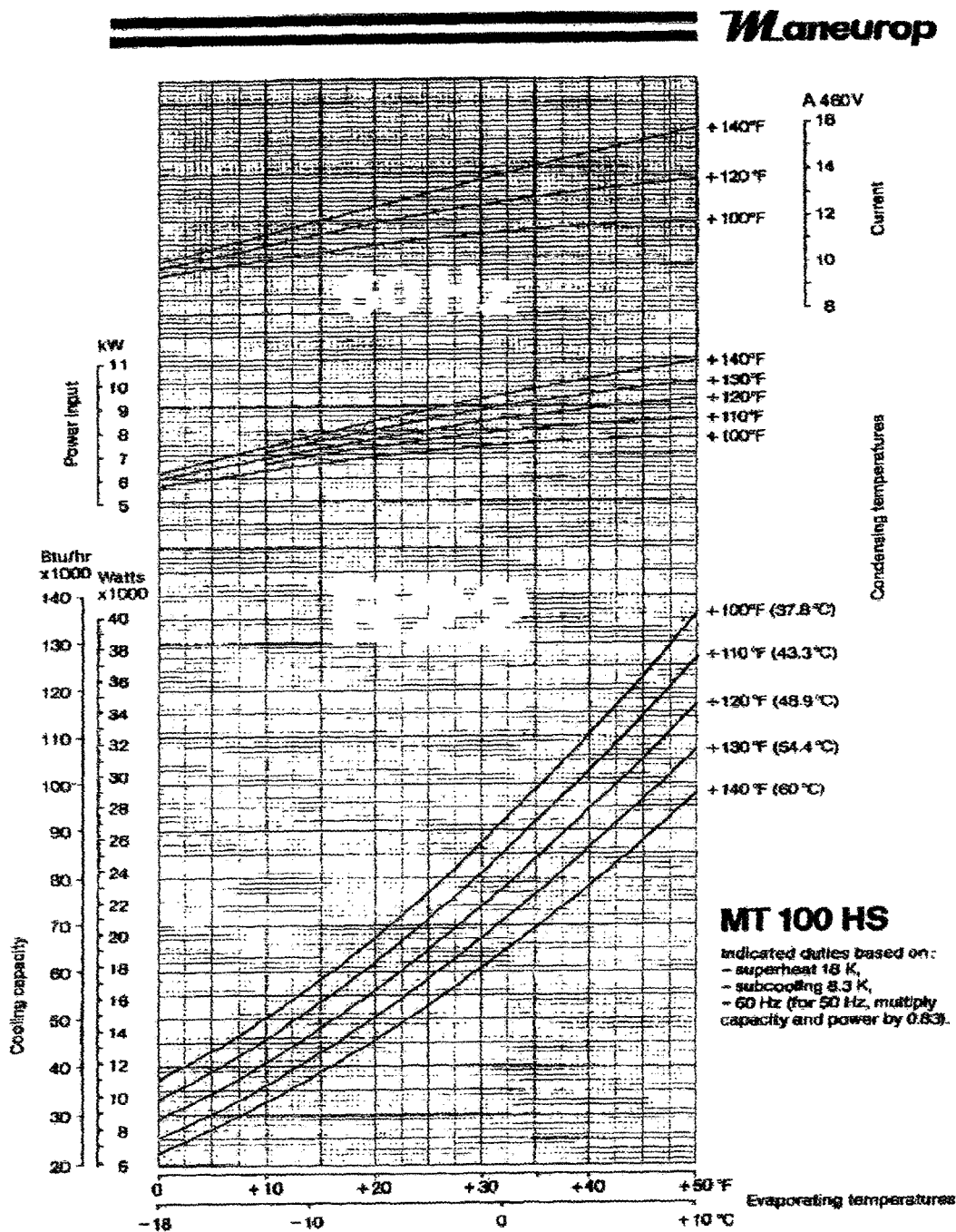
Figure 8:
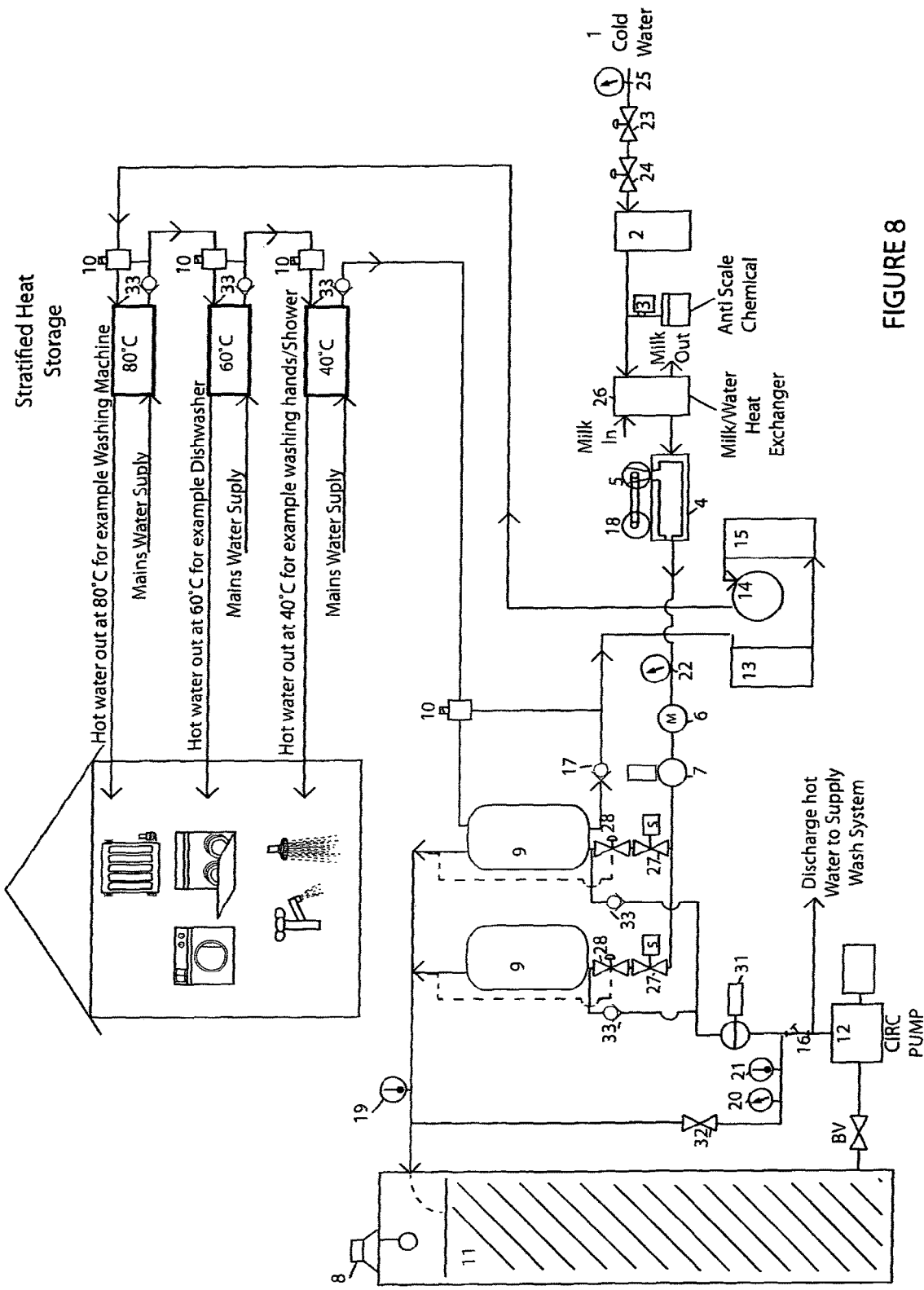

FIG. 7 is an illustration of the performance of a Maneurop MT100HS refrigeration compressor operating at 60 Hz using R22 as refrigerant; and FIG. 8 is an illustration of how a system according to the present invention can be combined with a plurality of heat storage units arranged to operate at a cascade of temperatures, each heat storage unit able to feed hot water requirements at different temperatures.

Like reference numerals are used in the following description and drawings to indicate various component parts of which the following is a list:
1. Incoming cold water
2. Water softener
3. Liquid injection pump
4. Shell & tube heat exchanger
5. Vacuum pump
6. Water flow meter
7. Cold water single pass (instant heat) control valve
8. Float switch
9. Brazed plate heat exchanger
10. Three way hot gas valve
11. Water storage tank or reservoir
12. Hot water circulating pump
13. Condenser
14. Compressor
15. Evaporator
16. Y strainer
17. Magnetic non-return valve e.g. Magni® check valve
18. Electric motor for vacuum pump
19. Temperature control sensor #2
20. Pressure gauge #1
21. Temperature control sensor #1
22. Pressure gauge #2
23. Pressure regulator
24. Flow regulator
25. Pressure gauge #3
26. Milk/Water heat exchanger
27. Brazed plate cold water solenoid
28. Temperature control valve
31. Hot water circulation control valve
32. Flow control valve
33. Spring check valve
BV Ball Valve Example of Operating Procedure of the Invention with Reference to FIG. 1

1. Filling Mode with Single Pass (Instant Heating)

When the refrigeration system is activated either manually or automatically, it will be put into cooling mode, energising the refrigeration compressor until the cooling set point is reached. When the refrigeration compressor is energised, it sends a signal to the hot water storage tank float switch (8).

If the level in the hot water storage tank (11) is low, the float switch (8) contacts close, sending signals to open the cold water supply valve (7) and simultaneously to close the circulation valve (31). In this way, the heat exchanger (9) switches from circulation mode to filling mode. The level in the hot water storage tank at which the float switch contacts close may be adjusted. Typically, the contacts of the float switch (8) are set to close when the level of hot water in the storage tank (11) has fallen by 15-25% from its level when full.

Incoming cold water flows through a pressure regulator (23) giving the cold water inlet system a stable pressure, typically around 15 psi (1.0 bar). The water volume is controlled by a flow regulator (24), allowing temperature control valve(s) (28) to operate at a consistent flow rate. The cold water feed then passes through a water softener (2) to eliminate water hardness.

As the cold water feed passes through the water flow meter (6), a pulsed signal is sent to the liquid inhibitor injection pump (3). The liquid inhibitor is selected to treat scale build up and corrosion, thereby increasing equipment life. A typical liquid inhibitor is D-Calcifi® marketed by TCP Water Solutions Inc. The quantity of liquid inhibitor injected by the liquid injection pump is adjusted depending upon water volume and quality. Where local regulations permit, a milk/water heat exchanger (26) can be installed, allowing further energy efficiency gains by exchanging some of the heat contained within milk at body temperature (98° F. or 37° C.) with incoming cold water at say 40° F. (5° C.).

The cold water feed then passes through a vacuum pump exhaust heat exchanger (4) where it recovers waste heat. By these pre-heating operations, we attain a desired exit temperature more quickly at the brazed plate heat exchanger (9), allowing the process of the present invention to generate a larger volume of hot water at the desired temperature.

The cold water feed flows from the cold water supply inlet valve (7) to the brazed plate heat exchanger solenoid valve (27). When the compressor is energised, it also energised the brazed plate solenoid valve (27) along with the 3 way hot gas valve (10).

The hot refrigerant gas heats the water inside the brazed plate heat exchanger (9) until the water leaving the heat exchanger reaches 140° F. (60° C.) when a temperature control valve (28) will begin to open and allow hot water to flow into the hot water storage tank (11). The temperature of the hot water fill can be adjusted by means of the temperature control valve (28).

During the fill mode, the water in the storage tank (11) is circulated by means of a pump (12) in a circuit that by-passes the heat exchanger (9). The circulating pump (12) preferably runs continuously and a flow control valve (32) is provided in order to return enough hot water to the top of the hot water storage tank (11) to ensure that the circulating pump (12) does not become overheated and thereby damaged. The flow through the flow control valve (32) is set manually at a level which provides sufficient flow through the circulating pump (12) and sufficient hot water pressure for washing when hot water is withdrawn via an outlet during the filling mode.

2. Circulation Mode

When the hot water tank float switch (8) signals that the tank (11) is full, the contacts of the float switch (8) open, causing the cold water supply inlet valve (7) to the heat exchanger (9) to close, and simultaneously, the flow control valve (32) to close and the circulation valve (31) to open, allowing water to enter the brazed plate heat exchanger (9) as the heat exchanger (9) switches from filling mode to circulation mode.

When this happens, the tank (11) will have received feed water at a temperature set by the temperature control valve (28), for example 140° F. (60° C.). The temperature controller (21) will be set at a higher temperature than that of the feed water by, for example, 10° F. (5° C.), making the set point of the temperature controller 150° F. (65° C.) in this example.

The circulating pump (12) preferably runs continuously, pumping hot water from the bottom of the water storage tank (11) through a flow restrictor at the inlet to the brazed plate heat exchanger (9), thereby creating a back pressure which produces a stable hot water system pressure for washing. The hot water pressure for washing may be adjusted by varying the diameter of the flow restrictor.

There is a large increase in volume of water flowing through the brazed plate heat exchanger (9) during this operating mode. As an example, the flow of water during the circulation mode could be 10 US gallons (38 liters) per minute in a 10 ton (35.2 kW) brazed plate heat exchanger, whereas during the filling mode, it could only be 1 US gallon (3.8 liters) per minute. The higher volume during the circulation mode creates turbulence which in turn provides excellent cleaning action within the brazed plate heat exchanger (9), thereby prolonging their service life.

During the circulation mode, once the hot water has reached a set temperature for example 150° F. (65° C.), the (normally closed) contacts will open, breaking the 24 volt AC signal to the three way hot gas valve (10). This diverts the hot gas such that it then by-passes the brazed plate heat exchanger (9) and is prevented from re-entering the exit gas side of the brazed plate heat exchanger (9) by means of a magnetic non-return valve (17), for example a Magni Check® valve, installed in the exit gas line from the brazed plate heat exchanger (9). The purpose of the magnetic non-return valve (17) is to prevent refrigerant from migrating into the brazed plate heat exchangers (9) under certain operating conditions. When the brazed plate heat exchanger (9) is by-passed, the hot gas is cooled in a fan cooled or water cooled condenser (13). The condensed refrigerant is then vaporised in the evaporator (15) creating refrigeration capacity. This mode continues until the milk tank or chiller set point is reached.

When the milk or chilled water set point is reached, the compressor will de-energize and shut down, breaking the 24 volts ac signal to the brazed plate heat exchanger solenoid (27) and also to the three way hot gas valve (10). The hot water continues to circulate at a high volume either through a spring check valve (33) during circulation mode or through a by-pass loop in which a flow control valve (32) is located, during the filling mode.

If an electrical overload fault occurs to the centrifugal pump (12), due, for example, to a blockage in the pump head or a power surge, the centrifugal pump (12) starter will trip breaking the 24 volt ac signal de-energizing the three way hot gas valve (10), preventing the water becoming overheated in the brazed plate heat exchanger (9) and thereby causing damage to the stainless steel plates therewithin.

The circulating pump (12) runs continuously, thereby pressurising the hot water system whenever hot water is required. The temperature control sensor (19) is an emergency over temperature sensor which, for example, could be set at 160° F. (71° C.). This sensor will de-energize the three way hot gas valve (10) if it senses that the water temperature leaving the brazed plate heat exchanger (9) has risen above the set temperature. If and when this happens, it would indicate, for example, a faulty temperature control valve (28), a faulty sensor (21), or possibly even a blockage in the brazed plate heat exchanger (9).

3. Wash Cycle

Hot water generated from the heat recovery system is used to wash the stainless steel pipe line system and tanks used for transferring and storing, amongst other edible liquids, milk from the milking station. The system uses a succession of operations. A first rinse operation is carried out with a mixture of hot and cold water giving a line temperature of 110-120° F. (43-49° C.), followed by a second operation using hot water and pipe line cleaning chemicals such as Acidclean® from HYPRED SA. The initial hot water travelling through the system may be put to waste by opening divert valves, either manually or by means of an automated system, in order that the circulating hot water temperature may reach a set point such as 150° F. or 65° C., more quickly. This accelerates the process of raising the stainless steel pipework to the temperature of the circulating hot water. Once the divert valves close, the system is able to complete a pre-set circulating time cycle dependant upon parlour size. A typical time cycle would be 1.5 minutes with hot water put to waste followed by 9.5 minutes of circulating hot water. The third operation is a rinse with either cold or hot water, followed by a fourth final rinse operation to sanitize the lines with cold or hot water containing an appropriate quantity of a sanitizing agent such as Alkaclean® from HYPRED SA Hot water is also used to wash the milk cooling tanks although the temperature does not need to be as high as 150° F. (65° C.) as hot water of such temperature can stress the stainless steel evaporator plates. Other uses for the hot water system are commercial washing machines and for mixing calf powder to a feeding temperature of approx 105° F. (40° C.), although these other uses are by no means limiting.

Figure 1:
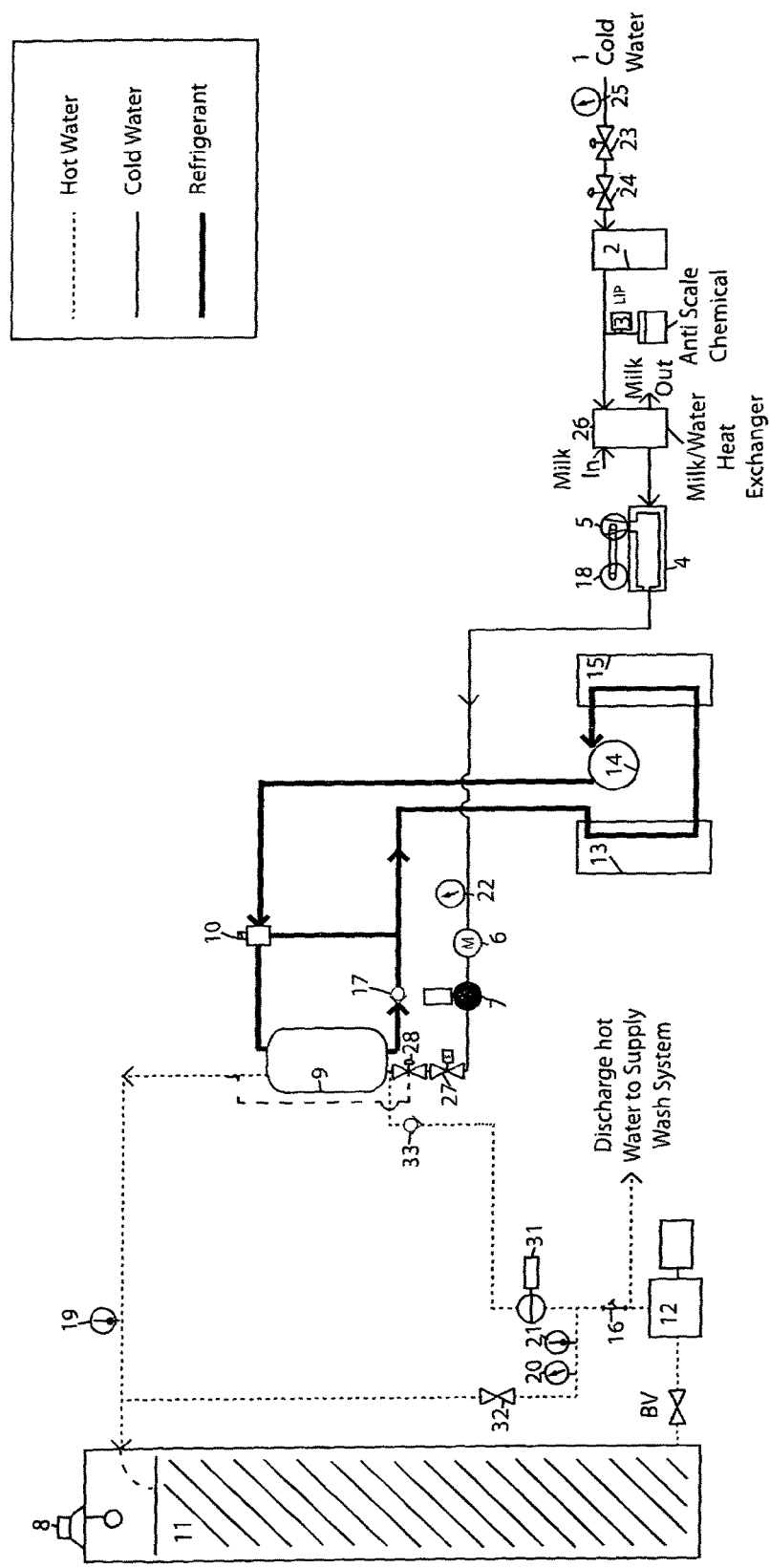
FIG. 1 illustrates a system according to the present invention operating with one compressor and one heat exchanger.
Figure 2:
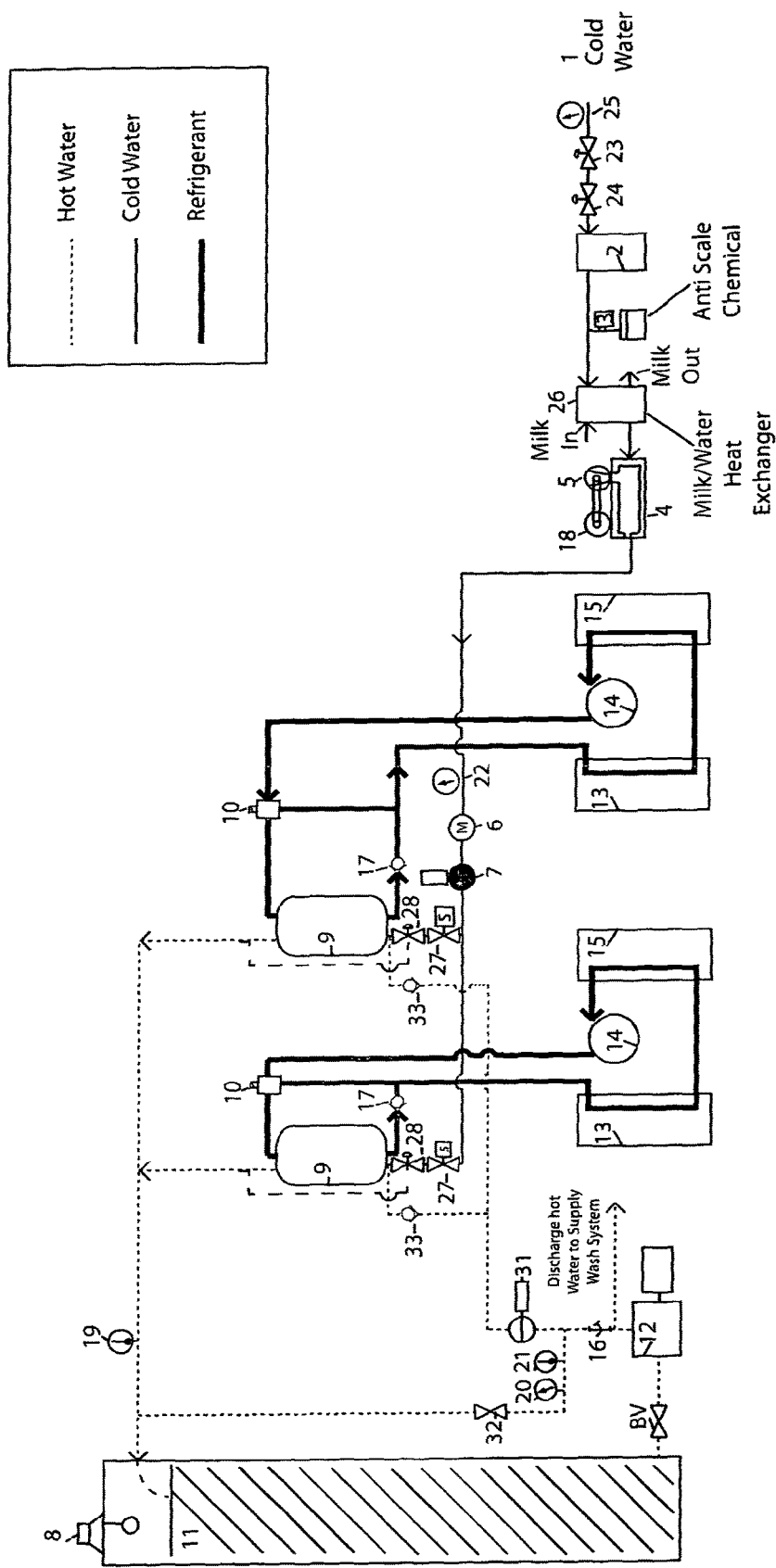
FIG. 2 illustrates a system according to the present invention operating with two compressors and two heat exchangers.

The system shown in FIG. 2 has two heat exchangers 9 and two compressors 14. The operation of this system is similar to and will be understood from the description of the system shown in FIG. 1.

A control diagram for the systems shown in FIGS. 1 and 2 is shown in FIG. 8 and includes . . .

Test #1

Performance Test circulating 110 US Gallons (420 liters) at 10 US gallons (37.8 liters) per minute using waste heat from a Maneurop MT 100 Compressor.

Figure 3:
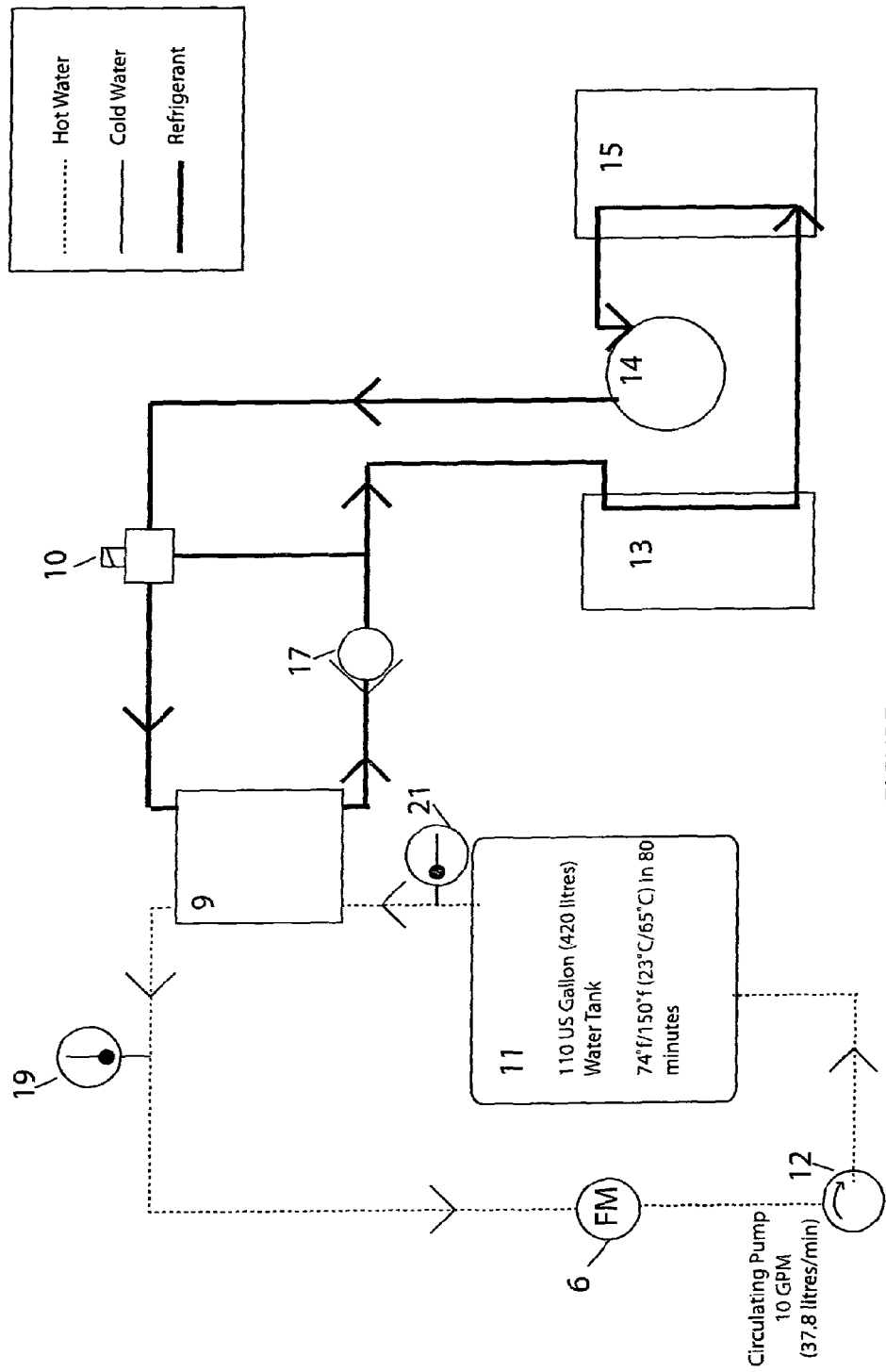
FIG. 3 is a flow diagram of a system according to the present invention set up in circulation mode with water circulating at 10 US gallons (37.8 liters) per minute in order to test the rate at which heat could be transferred to the circulating water (Test #1)
Figure 4:
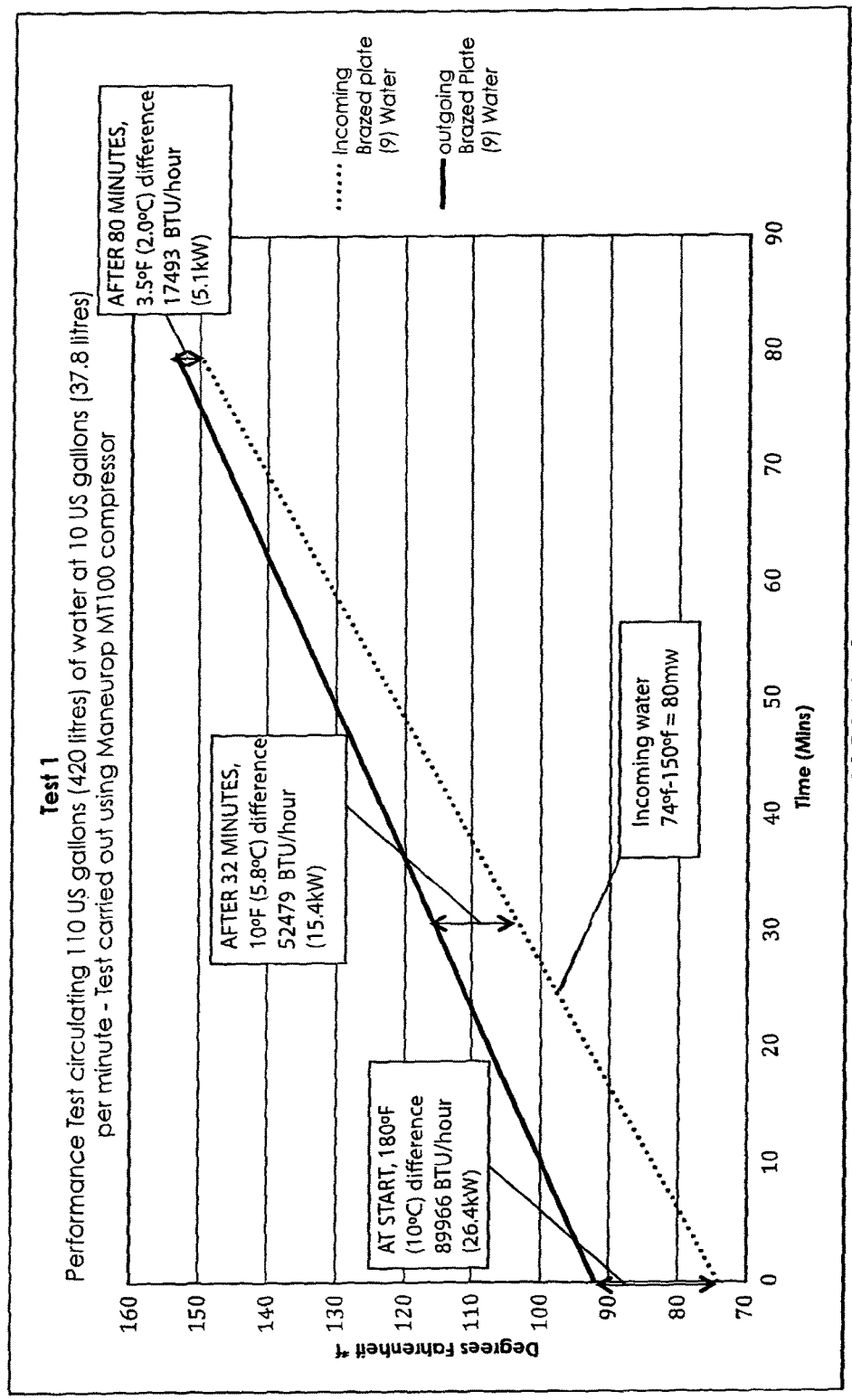
FIG. 4 is a graphical presentation of the results of Test #1.

The configuration of the system used in Test #1 is shown in FIG. 3 and the results obtained are shown in graphical form in FIG. 4.

Test #1 was carried out to check the BTUs available when circulating well water initially at 74° F. through a 10 ton (35.2 kW) brazed plate heat exchanger (9) at a flow rate of 10 US gallons (37.8 liters) per minute against the hot discharge gas of a Maneurop MT 100 compressor (14).

This was the first test carried out to see if it would be possible to create enough hot water at 150° F. (65° C.) to supply a 1,500 cow dairy running three Maneurop MT 100 compressors (14) on its chilled water system which typically runs at an evaporating temperature of 40-55° F. (4-13° C.). The results, which are illustrated on performance chart #1, show that 110 US gallons (420 liters) of well water at 74° F. (23° C.) were able to be heated to the required temperature of 150° F. (65° C.) in 80 minutes.

With three Maneurop MT 100 compressors (14) running for 16 hours per day, it would therefore be possible to produce over 3,000 US gallons (11,400 liters) at 150° F. (65° C.), proving that no supplementary energy was required other than waste heat as described in the present invention.

Figure 5:
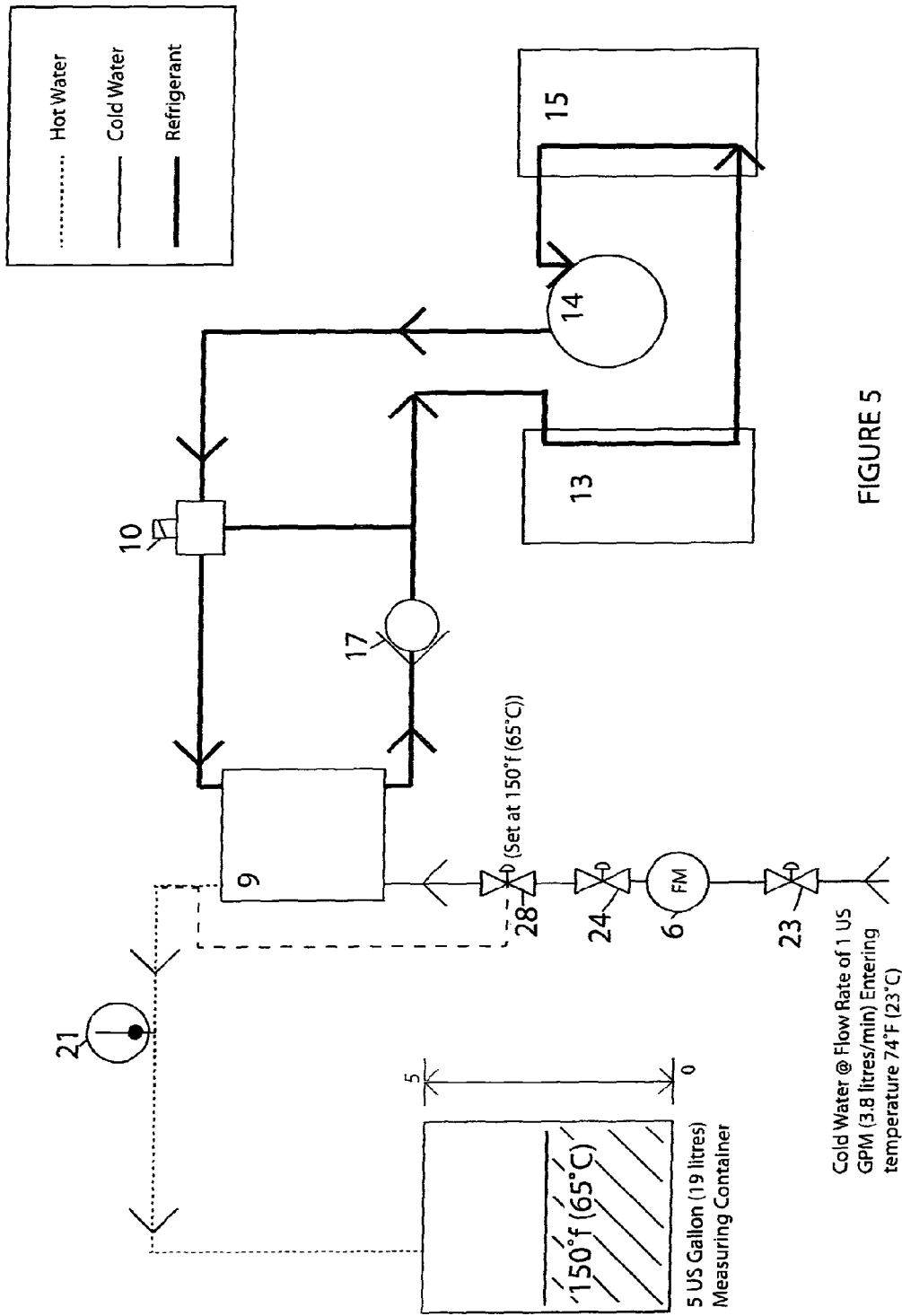
FIG. 5 is a flow diagram of a system according to the present invention set up in filling mode with water entering at 1.0 US gallons (3.8 liters) per minute in order to test the rate at which heat could be transferred to the entering water (Test #2)
Figure 6:
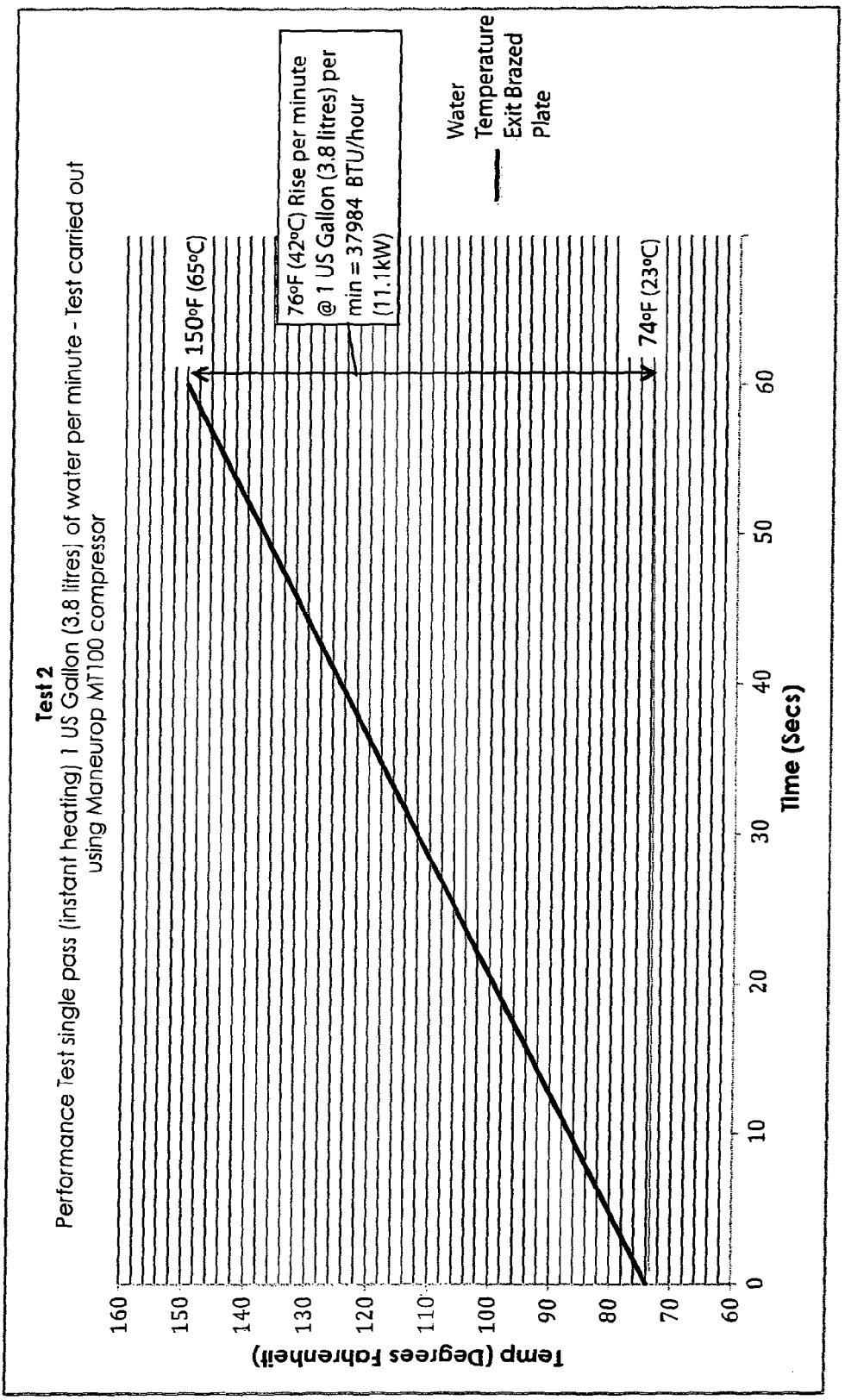
FIG. 6 is a graphical presentation of the results of Test #2.

Test #2:

Performance Test of a Single Pass (Instant Heating) of 1 US gallon (3.8 liters) per minute of well water from 74° F. to 150° F. (23° C. to 65° C.) using waste heat from a Maneurop MT100HS® Compressor The configuration of the system used in Test #2 is shown in FIG. 5 and the results obtained are shown in graphical form in FIG. 6.

Test #2 was carried out to see what flow rate could be achieved whilst obtaining an exit temperature of 150° F. (65° C.). The well water was connected directly to the inlet of the brazed plate heat exchangers (9) and the temperature of the hot water leaving the brazed plate heat exchangers (9) was regulated by means of a temperature control valve (28) set at 150° F. (65° C.). With water entering the brazed plate heat exchangers (9) at 74° F. (23° C.), we were able to maintain 150° F.+/−5° F. (65° C.+/−3° C.) at a flow rate of one US gallon (3.8 liters) per minute, thereby demonstrating that the system of this invention had a capability of supplying the water tank with single pass (instant) hot water. This is shown as a performance chart in FIG. 6.

The second test, using the same number (three) of Maneurop MT100HS® compressors as in the first test, was performed at a second dairy, also in Texas. This second dairy uses an average of 2,000 US gallons (7,600 liters) of hot water per day. To produce the volume of hot water used at the second dairy with a conventional propane system would cost $24,656 per year, as can be seen in the calculations shown below. Using electrical energy, it would cost $25,181, as can also be seen in the calculations shown below.

Use of the present invention can avoid the need for purchase of supplementary energy for hot water heating such that the investment required to practise the present invention could be paid back in 12 to 18 months providing that no degree of waste heat recovery is currently being practised.

The system of this invention out performs heat recovery tanks which are currently promoted throughout the dairy industry as providing an estimated pay back on investment of 36 months.

A major advantage of the system of this invention, when compared to conventional heat recovery tanks, is that a far greater percentage of the usable waste heat is transferred to the hot water such that purchase of supplementary energy for heating the hot water can be avoided.

Calculation of Typical Savings Resulting from Use of the Present Invention as Successfully Demonstrated in Test #2

The following calculations are intended to demonstrate an order of magnitude of savings that can be obtained by use of the present invention. The prices of propane and electricity are those that were being charged in Texas, USA as at the priority date of this application.

Assumptions:
1. No waste heat recovery
2. Daily requirement of 2000 US gallons (7,600 liters) of hot water at 150° F. (65° C.).
3. Pressurized systems require a set point of 180° F. (82° C.). When hot water is removed for washing food processing equipment, cold water enters the system, instantly cooling the hot water and giving a blended temperature of around the required temperature. (150° F. or 65° C.).
4. 1.0 US gallon (3.8 liters) of propane generates 91,500 BTU (26.8 kW).
5. 80% efficiency of heating hot water using propane by pressurised closed loop hot water heating system.
6. 1.0 kW of electricity generates 3414.4 BTU (1.0 kW).
7. 90% efficiency of heating hot water using electrical heating elements.

| Energy Consumption | | |
|---|---|---|
| 2,000 US gallons of hot water | 8.33 lbs per US gallon | 16,660 lbs |
| Temperature rise | 180 − 74 = 106° F. | |
| Theoretical energy required | 16,660 lbs × 106° F. | 1,765,960 BTU |

| | PROPANE | ELECTRICITY |
|---|---|---|
| 1,765,960 BTU theory | 1,765,960/91,500 = 19.30 US gallons | 1,765,960/3414.4 = 517.21 kW |
| 1,765,960 BTU practice | 19.30/0.8 = 24.10 US gallons | 517.21/0.9 = 574.68 kW |
| Price of propane/electricity | $2.80 per US gallon | $0.12 per kW |
| Daily cost of propane/electricity | 24.10 × 2.80 = $67.55 | 574.68 × 0.12 = $68.96 |
| Annual cost of propane/electricity | $67.55 × 365 = $24,656 | 68.96 × 365 = $25,171 |

By use of the present invention, no supplementary energy, whether derived from propane, electricity or other means, is required to heat the required volume of hot water and hence the savings will be as shown above when compared to the absence of any waste heat recovery. The savings in a case where some degree of waste heat recovery is being practised will be less than the figures shown above.

The waste heat recovery system of the present invention also creates up to 20% electrical energy savings depending on ambient temperature. This saving is created by an increase in condenser efficiency due to the addition of one or more hot gas heat exchangers (9) which operate as a pre-condenser during the fill cycle. During the circulation phase, the hot gas heat exchangers de-superheat the hot gas before it reaches the condenser. It can be seen from the Maneurop MT100HSHS® performance chart at FIG. 4 that by decreasing the condensing temperature in this way, the compressor's cooling capacity is increased and its power requirement is correspondingly reduced, thereby creating electrical energy savings.

During the cooling cycle, a typical hot gas discharge temperature from the compressor is 210° F. (99° C.) when operating with a temperature of 40-50° F. (4-10° C.) leaving the evaporator.

During the fill cycle, when the entering mains water temperature is 74° F. (23° C.), the temperature of the refrigerant leaving the brazed plate heat exchanger (9) is 90-100° F. (32-38° C.).

During the circulation phase, the hot gas is de-superheated to 140-150° F. (60-65° C.) and with the addition of a hot gas heat exchanger (9) for each compressor as illustrated in FIG. 2, it is possible to maintain a condensing temperature of 100° F. (38° C.) which allows the compressor to operate at maximum efficiency, thereby creating electrical energy savings of up to 20%.

FIG. 8 shows a modification of the system shown in FIG. 2 which is also applicable to the system shown in FIG. 1 to include one or more heat storage units for recovery of waste heat when there is little or no requirement for use of recovered heat in the hot water storage tank 11, for example, once the water storage tank 11 is full and the temperature set point has been satisfied. Such heat storage units can be installed in applications where storage space is an issue. The heat storage units may be designed and built specifically to take account of the physical properties of the refrigerant being used. FIG. 8 shows an arrangement where a plurality of heat storage units are arranged to operate at a cascade of design temperatures, each heat storage unit able to feed hot water requirements at different temperatures such as 80° C., 60° C. and 40° C. as illustrated in FIG. 8. When the hot water tank 11 is full of hot water at the required temperature and there is therefore no longer any waste heat required for heating hot water, the hot refrigerant gas is diverted to the bank of heat storage units preferably arranged in a cascade of design temperatures. At this point, the three way hot gas valves 10 at entry to each bank of heat storage units will open and the hot refrigerant gas will flow through the banks of heat storage units in descending order of design temperatures. When the heat storage unit with a design temperature of 80° C. has absorbed its maximum amount of waste heat, the three way valve 10 at entry to this heat storage unit will close and with the spring check valve 33 preventing return, the hot refrigerant gas will no longer flow through this heat storage unit but will flow directly to the following heat storage unit with a design temperature of 60° C. When this heat storage unit has absorbed its maximum amount of heat, the three way valve at entry to this heat storage unit will close and the hot refrigerant gas will flow directly to the following heat storage unit with a design temperature of 40° C. When all heat storage units have absorbed their maximum amount of waste heat, the hot refrigerant gas will flow directly to the condenser 13 and no further waste heat will be recovered until hot water is drawn from the system either from the hot water tank 11 or from one of the banks of heat storage units. In FIG. 8, it should be understood that the design temperatures of the heat storage units are shown for illustrative purposes only. In practice, the number of banks of heat storage units and the design temperatures of each will depend upon the physical properties of the refrigerant and of the phase change materials contained within each bank of heat storage units. FIG. 8 illustrates heat storage units able to feed hot water of differing temperatures to a domestic house, for example, a house located adjacent to the premises requiring a supply of hot water, but this is shown for illustrative purposes only. The hot water of differing temperatures can be fed from the heat storage units for use in industrial, commercial or domestic applications.

A preferred type of heat storage unit for this aspect of the invention are those containing phase change materials in order to access the latent heat associated with phase change. It will be apparent that heat storage units of differing design temperatures will contain a different phase change material. The heat storage units are connected in series, making the refrigerant travel through heat storage units of descending design temperature, heating the phase change material in each heat storage unit until its design temperature is reached, at which temperature the phase change material changes state, for example from solid to liquid, and the three-way gas valve 10 closes so that the refrigerant by-passes the heat storage unit as described above. To return the phase change material to its original state, a colder fluid including but not limited to water, air or gas, can be passed through the secondary circuit of the heat storage unit. The heat storage unit is then able to release the heat back into the receiving fluid, as the phase change material reverts to its original state, for example from liquid back to solid. FIG. 8 shows by way of example use of water from a mains water supply (or any other source) as the receiving fluid in the secondary circuit to provide hot water having a range of temperatures for different uses. Any heat storage unit in such a system may have multiple heat exchangers from separate compressors incorporated within its system, so that the heat storage unit can be charged with heat from multiple cooling circuits. In order to increase the rate of heat transfer within a heat storage unit or a plurality of heat storage units of similar design temperature, once its design temperature has been exceeded and the phase change material has changed state, for example from solid to liquid, it may be beneficial to include an in-line pump to circulate the phase change material in liquid form within the one or more heat storage units of similar design temperature and thereby increase the rate of heat transfer.

Although in the exemplary embodiment, the invention has been described in a system for recovering waste heat to heat water for use in a dairy, it will be understood that the invention is not limited to such use and that the invention has wider application and can be used in any area where there is a need for hot water and an available source of waste heat. For example, the invention may be used in breweries, wineries, cheese plants, meat processing plants and any other food processing plants or more generally, for example in buildings such as hospitals, hotels and indoor swimming pools.

Furthermore, the invention may have wider application to a system and/or method for recovering waste heat to heat a receiving fluid. Thus the invention may extend to and include a heat recovery system arranged to heat a receiving fluid wherein the system includes one or more heat exchangers arranged to heat the receiving fluid by heat exchange with waste heat, a storage reservoir arranged to store the receiving fluid so heated by the heat exchanger(s), and a pump, wherein the heat exchanger(s) is/are switchable between a first mode of operation in which the receiving fluid is circulated by the pump in a circuit that includes the storage reservoir and the heat exchanger(s), and a second mode of operation in which the receiving fluid is circulated by the pump in a circuit that by-passes the heat exchanger(s), wherein heated receiving fluid of at least a desired minimum temperature can be supplied to at least one outlet during both the first and second modes of operation. The receiving fluid may be water, oil, milk or other liquids which are frequently but not necessarily consumable liquids. By way of example, the waste heat can be used to pasteurise consumable liquids or defrost transported food and drink which have been frozen for transportation. This system may employ any of the features of the systems described herein. A method of recovering waste heat to heat a receiving fluid employing the system is also within the scope of the invention.

The invention claimed is:

1. A heat recovery system arranged to heat water wherein the system comprises one or more heat exchangers arranged to heat water by heat exchange with waste heat, a storage reservoir arranged to store water so heated by the heat exchanger(s), at least one hot water outlet and a pump, wherein the flow of water through the one or more heat exchanger(s) is switched according to the water level in the storage reservoir between a first mode of operation in which a flow of heated water is circulated by the pump in a circuit that includes the storage reservoir and the heat exchanger(s), and a second mode of operation in which incoming cold water is admitted to the system while the heated water from the storage reservoir is circulated by the pump in a second circuit that includes a by-pass valve arranged to by-pass the heat exchanger(s), wherein heated water of at least a desired minimum temperature can be supplied to the at least one outlet during both the first and second modes of operation and wherein the heat exchanger(s) is/are connected to the incoming supply of water during the second mode of operation and wherein a flow of fill water from the heat exchanger(s) to the storage reservoir is controlled by a temperature control valve in the second mode of operation.

2. The system of claim 1 wherein the one or more heat exchangers are switched to the first mode of operation when the water level in the storage reservoir reaches an upper limit.

3. The system of claim 2 wherein circulation of water through the one or more heat exchangers in the first mode of operation is employed to maintain the desired minimum water temperature in the storage reservoir.

4. The system according to claim 3 wherein the waste heat by-passes the one or more heat exchangers in the first mode of operation when the desired minimum water temperature in the storage reservoir is reached.

5. The system according to claim 3 wherein the waste heat is diverted to one or to a plurality of heat storage units once a desired maximum water temperature in the storage reservoir is reached, wherein the water in each of the one or the plurality of heat storage units is set to a predetermined highest design temperature, and only when the heat storage units are full does the waste heat by-pass the one or more heat exchangers.

6. The system according to claim 5 wherein the plurality of multiple heat storage units is arranged in a cascade starting with the highest design temperature heat storage unit, and thereafter gradually descending the design temperatures of succeeding heat storage units until the condensing temperature of the refrigerant is reached.

7. The system according to claim 1 wherein the one or more heat exchangers are switched to the second mode of operation when the water level in the storage reservoir reaches a lower limit.

8. The system according to claim 7 wherein circulation of water to bypass the one or more heat exchangers is employed in the second mode of operation to allow the one or more heat exchangers to heat an incoming supply of water to fill the storage reservoir without the temperature of the heated water in the storage reservoir falling below the desired minimum level.

9. The system according to claim 8 wherein the one or more heat exchangers heat the incoming supply of water in the second mode of operation to a temperature higher than the desired minimum temperature in the storage reservoir.

10. The system according to claim 1 wherein the pump runs continuously during the first and second modes of operation.

11. The system according to claim 1 wherein the waste heat is derived from a refrigeration system.

12. The system according to claim 1 wherein the waste heat is derived from an air conditioning system.

13. A method of recovering waste heat to heat water by providing a system according to claim 1.

14. A method of recovering waste heat to heat any suitable heat transfer fluid or any receiving fluid by providing a system according to claim 1.

15. The system according to claim 1 wherein the heat exchangers are double walled heat exchangers.

16. A heat recovery system arranged to heat water wherein the system comprises one or more heat exchangers arranged to heat water by heat exchange with waste heat, a storage reservoir arranged to store water so heated by the one or more heat exchangers, at least one hot water outlet and a pump, wherein the one or more heat exchangers is/are switched between a first mode of operation in which a flow of water is circulated by the pump in a circuit that includes the storage reservoir and the one or more heat exchangers, and a second mode of operation in which the flow of water is circulated by the pump in a second circuit that includes the storage reservoir and the one or more heat exchangers and a by-pass valve arranged to by-pass the one or more heat exchangers, wherein heated water of at least a desired minimum temperature can be supplied to the at least one outlet during both the first and second modes of operation, and wherein the one or more heat exchangers are connected to an incoming supply of water during the second mode of operation and wherein a flow of water from the heat exchanger(s) to the storage reservoir is controlled by a temperature control valve in the second mode of operation, the one or more heat exchangers being switched between the first and second modes of operation according to the water level in the storage reservoir.

* * * * *